A. L. P GUÉRET.
VALVE MECHANISM FOR INTERNAL COMBUSTION ENGINES.
APPLICATION FILED DEC. 28, 1918.
1,425,381.
Patented Aug. 8, 1922.
2 SHEETS—SHEET 1.
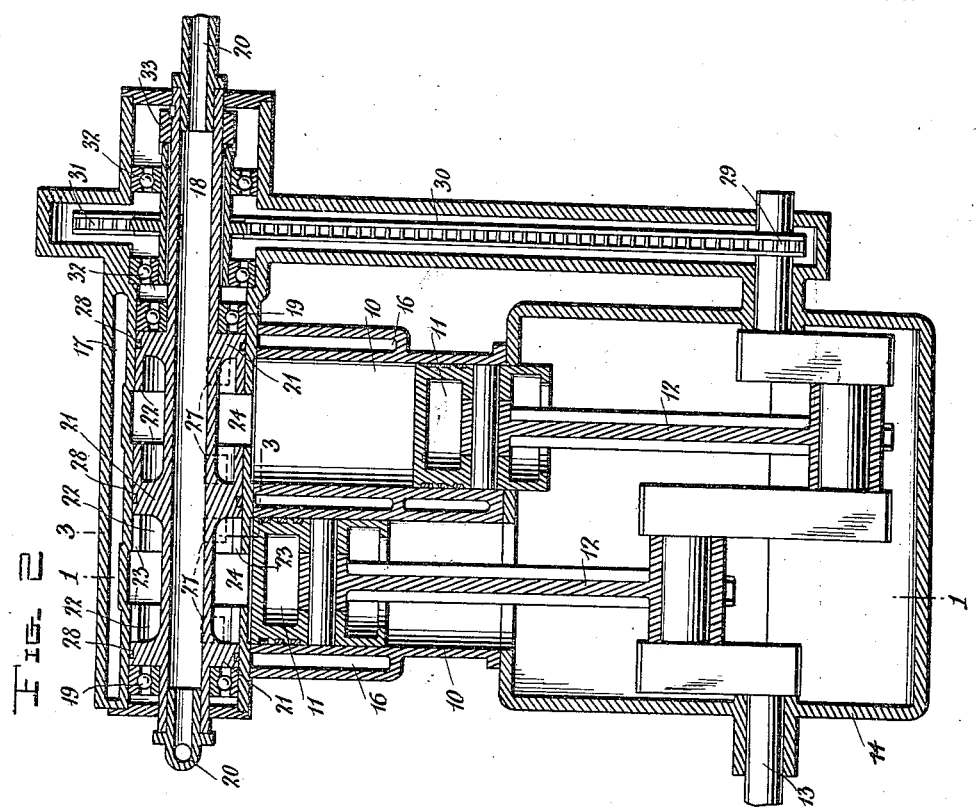
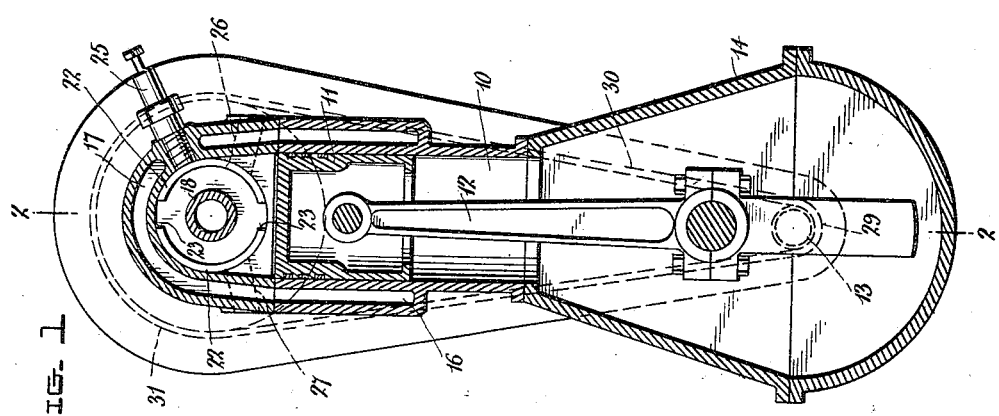
Inventor
André Léon P. Guéret,
Witnesses
By
Attorney

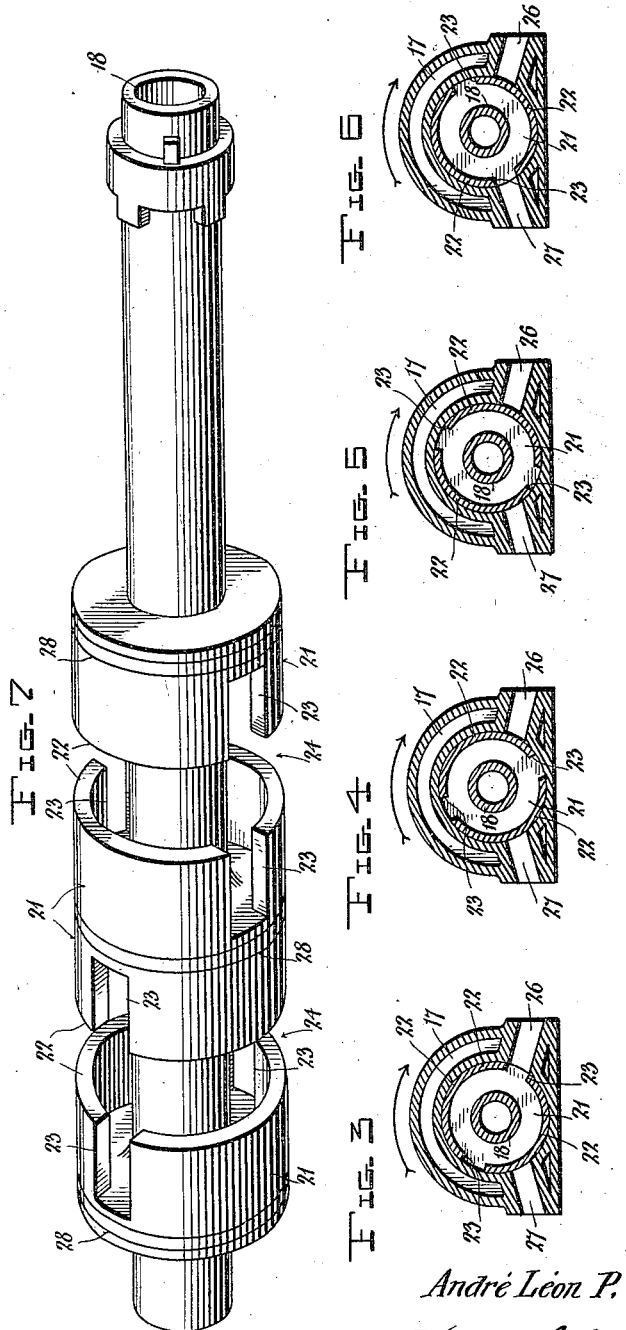

UNITED STATES PATENT OFFICE.

ANDRÉ LÉON P. GUÉRET, OF PARIS, FRANCE.

VALVE MECHANISM FOR INTERNAL-COMBUSTION ENGINES.

1,425,381.   Specification of Letters Patent.   Patented Aug. 8, 1922.

Application filed December 28, 1918. Serial No. 268,689.

*To all whom it may concern:*

Be it known that I, ANDRÉ LÉON P. GUÉRET, a citizen of the Republic of France, residing at Paris, France, have invented certain new and useful Improvements in Valve Mechanisms for Internal-Combustion Engines, of which the following is a specification.

This invention relates to valve mechanism for internal combustion engines of the general type employing a rotary valve, usually located in the cylinder head, which is positively rotated by suitable connections with the crank shaft and in timed relation thereto in accordance with the cycle of operation of the engine.

The invention has for an object the provision of an improved valve for engines of this type wherein the pressures exerted thereon by the explosion, or otherwise, are balanced in all directions, both radially and axially of the valve, thereby avoiding eccentric strains tending to cause displacement or local deformation thereof.

Another object of the invention is to provide a valve of the character referred to wherein the possibility of leakage is reduced to a minimum, said valve having improved provision for insuring thorough lubrication thereof, and being of such a character as to permit the same to be readily and conveniently cooled.

A further object of the invention is the provision of improved means for mounting the valve and for connecting the same with its operating devices, said means being of such a character as to permit only the torque of the actuating and controlling gear to be transmitted to the valve, avoiding any eccentric strains thereon tending to displace, distort, or cramp the same, the connections being preferably also of such a nature as to yield under the application of excessive force thereto, thereby avoiding injury to either the controlling gear or the valve in the event of the accidental sticking of the latter.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise embodied and applied without departing from the spirit and scope thereof.

In said drawings:

Fig. 1 is a transverse vertical section, taken substantially on the line 1—1, Fig. 2, of an engine constructed in accordance with the invention.

Fig. 2 is a longitudinal vertical section on the line 2—2, Fig. 1.

Figs. 3, 4, 5, and 6 are sections on the line 3—3, Fig. 2, showing the valve in different positions.

Fig. 7 is a perspective view of the valve removed.

In principle, the invention is applicable to internal combustion engines having any number of cylinders and of any cycle, but for convenience there is herein illustrated a two-cylinder, four-cycle engine comprising a pair of integrally cast cylinders 10 containing pistons 11 connected by piston rods 12 with a crank shaft 13 journalled in a crank case 14 to which the cylinders 10 are bolted or otherwise secured at their inner lower ends. Similarly secured to the opposite or outer ends of the cylinders is a valve casing 15 of generally cylindrical form disposed transversely of the engine cylinders and containing the distributing valve hereinafter more fully described. The cylinders 10 are formed with the usual spaces 16 for the circulation of water, or other cooling fluid, said spaces communicating with a similar space 17 formed in the valve casing 15, the whole constituting a single, continuous cooling jacket for the cylinders and valve casing.

The valve comprises a hollow shaft 18 rotatably mounted in antifriction bearings 19 in the valve casing 15 and carrying one or more (herein two) sets of valve elements, one set being provided for each cylinder. At its ends the shaft 18 is connected, by suitable swivel couplings, with pipes 20, whereby a circulation of cooling fluid may be maintained through the interior of said shaft. Each set of valve elements comprises a pair of spaced, oppositely disposed, cup shaped members 21 having bases secured to or formed integral with the shaft 18 and flange portions 22 each provided with a pair of diametrically opposite notches or ports 23. The members 21 of each pair are disposed with their open sides directed toward one another and with their flanges separated by a space 24 opposite which the valve casing 15 is open to the corresponding cylinder 10, whereby the interiors of said members and the space between them communicate with and form, in effect, a part of the combustion chamber of said cylinder. The spark plugs 25 for the several cylinders are carried by the valve casing and project into the respective spaces 24. The valve casing 15 is provided with a series of inlet ports 26, communicating with the inlet manifold, and with a series of exhaust ports 27, said inlet and exhaust ports being each equal in number to the valve members 21, and there consequently being two of each of said ports for each cylinder 10. The inlet and exhaust ports are arranged in pairs, there being an inlet port 26 and an exhaust port 27 opposite each flange 22 and cooperating with the ports 23 therein, as clearly shown in Figs. 3 to 6. The valve members 21 may, if desired, be provided with circumferential packing grooves 28.

For rotating the valve above described in timed relation (in the present instance, in the ratio of 1 to 4) with the crank shaft 13, the following mechanism is provided. Said crank shaft is provided with a sprocket 29 connected by a chain 30 with a sprocket 31 having a hub loosely surrounding the valve shaft 18, and preferably out of engagement therewith, said hub being rotatably mounted, independently of said valve shaft, in antifriction bearings 32 carried by the valve casing 15. The torque of the sprocket 31 is transmitted to the valve shaft 18 by a jaw clutch comprising teeth formed on the end of the hub of said sprocket and engaging complementary teeth on a hub 33 keyed to or otherwise fast upon the shaft 18. The teeth on the hub 33 are relatively weak, and are preferably composed of comparatively brittle material, such as brass, highly tempered steel, or fiber, whereby the torque which may be transmitted through the clutch is limited, so that, in the event of the valve sticking from any cause, said teeth will break and prevent damage to the other parts of the mechanism.

One complete cycle of operations, during which the valve is rotated through an angle of 180°, is illustrated in Figs. 3 to 6, the direction of rotation being indicated by the arrows on the several views. Fig. 3 shows the position of the valve during the admission or suction stroke. At this time one of the ports 23 of each valve member opens communication with the intake manifold through the corresponding inlet port 26, admitting a charge of combustible mixture through the space 24 to the cylinder. During the compression and explosion strokes the valve occupies the positions shown in Figs. 4 and 5, respectively, wherein the inlet ports 26 and exhaust ports 27 are all closed or covered by the respective flanges 22. In Fig. 6 the valve is shown in the position assumed during the exhaust stroke, at which time one of the ports 23 of each valve member opens communication with the corresponding exhaust port 27. At the next succeeding suction stroke the valve is again moved into the position shown in Fig. 3, and the cycle of operation is repeated.

It will, of course, be understood that the rotary motion of the valve is continuous, said valve turning through an angle of 45° during each stroke of the engine, so that the valve positions illustrated in Figs. 3 to 6, and referred to above as corresponding to the several engine strokes, are approximate only, and each figure may be considered as showing the position of the valve with the piston at the middle of the corresponding stroke.

The several sets of valve elements corresponding respectively to the several cylinders of a multiple cylinder engine are arranged about their common axis with their ports 23 at different angular positions to produce the proper sequential operations of the pistons in said cylinders. Thus, in the two cylinder engine shown, the two sets of valve elements are angularly spaced approximately 90° from one another, as most clearly shown in Fig. 7.

It will be seen that, by reason of the annular form of the valve members 21 and the symmetrical arrangement of the ports 23, the pressures generated by the explosions or otherwise, within said members and within the spaces 24, are radially balanced, thereby preventing a symmetrical distortion of said members; and that, by reason of the opposite arrangement of said members in pairs, said pressures are also longitudinally balanced, thereby avoiding any tendency to axial displacement of the valve as a whole. The flanges 22 of the valve members are relatively thin and somewhat flexible (the latter quality being enhanced by the notches 23 in said flanges), so that the internal pressure tends to expand said members and force said flanges into close engagement with the walls of the valve cylinder, thereby preventing leakage.

By reason of the independent mounting of the sprocket wheel 31, the pull of the sprocket chain 30 thereon has no tendency to displace the valve in its bearings, so that said valve may be accurately centered in its casing and retained in such position. This not only prevents cramping and uneven wear, but permits the interposition between the valve and casing of a thin, continuous film of oil of substantially constant thickness throughout, which insures perfect lubrication and also, by reason of its high adhesion to the metal and its own capillary tension, assists further in the prevention of leakage.

These and other benefits and advantages of the invention will, however, be apparent to those skilled in the art without further detailed explanation.

What is claimed is—

1. In an internal combustion engine, the combination with a cylinder, of a valve casing having inlet and exhaust ports and a space communicating with said cylinder, and a rotary valve in said casing comprising a shaft and a pair of valve members thereon, said members being located at opposite sides of the space in said casing, and having oppositely disposed, thin, flexible, annular flanges having symmetrically arranged notches in their edges constituting ports cooperating with the ports in said casing.

2. In an internal combustion engine, in combination, a valve casing, a rotary valve therein, a hollow shaft for said valve, bearings in said casing for said shaft, a sprocket having a hub loosely surrounding said shaft, bearings in said casing for said hub, and a clutch for transmitting the torque of said sprocket to said shaft.

3. In an internal combustion engine, in combination, a valve casing, a rotary valve therein, a hollow shaft for said valve, bearings in said casing for said shaft, a sprocket having a hub loosely surrounding said shaft, bearings in said casing for said hub, a hub fast on said shaft, and relatively weak, brittle clutch teeth connecting said hubs.

In testimony whereof I have hereunto set my hand in presence of two subscribing witnesses.

ANDRÉ LÉON P. GUÉRET.

Witnesses:
JOSEPH T. BELANGER,
JOS. BELANGER.